United States Patent

Kambayashi et al.

[11] Patent Number: 5,995,024
[45] Date of Patent: *Nov. 30, 1999

[54] KEYBOARD AND NOTEBOOK TYPE COMPUTER

[75] Inventors: Ko Kambayashi; Hideyuki Motoyama; Takehiko Sato, all of Kawasaki, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/848,725

[22] Filed: May 22, 1997

[30] Foreign Application Priority Data

Oct. 11, 1996 [JP] Japan .................................... 8-270109

[51] Int. Cl.$^6$ ................................................ H03K 17/967
[52] U.S. Cl. ................................ 341/22; 341/20; 400/472
[58] Field of Search ................... 341/20, 22; 364/709.01, 364/790.12; 400/489, 472

[56] References Cited

U.S. PATENT DOCUMENTS

| | | | |
|---|---|---|---|
| 5,007,008 | 4/1991 | Beers | 364/709.15 |
| 5,140,632 | 8/1992 | Anten | 379/447 |
| 5,151,696 | 9/1992 | Kasahara | 341/22 |
| 5,334,976 | 8/1994 | Wang | 341/22 |
| 5,481,645 | 1/1996 | Bertino et al. | |
| 5,497,151 | 3/1996 | Dombroski | 341/22 |

FOREIGN PATENT DOCUMENTS 6-51941  2/1994  Japan .

OTHER PUBLICATIONS

A monthly Japanese magazine entitled *Mobile PC*, vol.2, No. 6, Jun. 1, 1996, pp. 25–19, with partial English language translation of relevant portions.

American National STandards for Human Factors Engineering of Visual Display Terminal Workstations, Jun. 1988.

*Primary Examiner*—Michael Horabik
*Assistant Examiner*—Albert K. Wong
*Attorney, Agent, or Firm*—Staas & Halsey LLP

[57] ABSTRACT

A keyboard of a notebook type computer that is small in size yet has a smooth key-in operation. The keyboard includes a plurality of keys including English letter key, with each of the keys having keytops arranged in transverse lines and vertical rows in a matrix manner, with a small gap between every two adjacent keytops. An arrangement of the keytops of the English letter keys is such that a pitch in a transverse direction is larger than that in a vertical direction, and a size of an upper surface of the keytop of the English letter key is such that a length in the transverse direction is larger than a length in the vertical direction.

4 Claims, 3 Drawing Sheets

KEYBOARD AND NOTEBOOK TYPE COMPUTER

BACKGROUND OF THE INVENTION

1. Field of the Invention

The present invention relates to a keyboard and a notebook type computer, specifically to a keyboard and a notebook type computer capable of being miniaturized while maintaining a favorable key-in operability.

2. Description of the Related Art

Personal computers have gradually been miniaturized to realize, at present, a portable notebook type computer as shown in FIG. 5. This notebook type computer includes a main body 2 having a keyboard 1, a display 3 and a hinge section 4 for coupling the display 3 with the main body 2, wherein the display 3 constitutes an openable/closable cover for the main body. The keyboard 1 has a plurality of keys having keytops 5 arranged in transverse lines and vertical rows in a matrix manner with a small gap between every two adjacent keytops, wherein information input from the keyboard 1 is processed by a CPU provided in the interior of the main body. The input information is displayed on the display 3.

The keyboard of the notebook computer described above is small in size because of the miniaturization of the computer itself. In addition, a marketed notebook type computer Libretto CTA 20 (provided from TOSHIBA) realizes the miniaturization of keyboard by using a keytop having longer transverse edges. In this regard, the outer periphery of this keytop is chamfered as shown in FIG. 6 so that an upper surface (operating surface) 6 of the keytop 5 has a square shape of about 8 mm per side.

According to the conventional notebook type personal computer described above, there are problems in that the key-in operation becomes inconvenient and an erroneous key touch may occur when the keyboard is operated by touch because the operating surface 6 of the keytop 5 is too small.

In view of such problems in the prior art, an object of the present invention is to provide a keyboard and a notebook type computer smaller in size without sacrificing the key-in operability.

SUMMARY OF THE INVENTION

Objects of the invention are achieved by, a keyboard comprising a plurality of keys including at least those for English letters having keytops arranged in transverse lines and vertical rows in a matrix manner with a small gap between every two adjacent keytops is provided, which is characterized in that the arrangement of the keytops of the keys for English letters is such that a pitch in the transverse direction is larger than that in the vertical direction, and a size of an upper surface of the keytop of the key for English letter is such that a length in the transverse direction is larger than that in the vertical direction. In addition thereto, a ratio between the transverse directional pitch of the keytops of the keys for English letters and the vertical directional pitch thereof is preferably in a range from 15:14 to 15:13. Further, a ratio between the transverse directional length of the upper surface of the keytop of the key for English letter and the vertical directional length thereof is preferably in a range from 15:14 to 15:13.

According to this structure, the vertical directional length of the upper surface of the keyboard becomes shorter to enable the miniaturization thereof. Since the transverse directional length of the keytop is longer than the vertical directional length thereof, it is possible to enlarge the operating surface and guarantee the operability of the keyboard.

Alternatively, according to a notebook type computer defined by any one of claims 4 through 7, a notebook type computer comprising a keyboard comprising a plurality of keys including at least those for English letters having keytops arranged in transverse lines and vertical rows in a matrix manner with a small gap between every two adjacent keytops, a main body comprising the keyboard and a CPU, and a cover having a display and capable of covering the main body is provided, which is characterized in that the arrangement of the keytops of the keys for English letters is such that a pitch in the transverse direction is larger than that in the vertical direction, and a size of an upper surface of the keytop of the key for English letter is such that a length in the transverse direction is larger than that in the vertical direction.

In addition thereto, a ratio between the transverse directional pitch of the keytops of the keys for English letters and the vertical directional pitch thereof is preferably in a range from 15:14 to 15:13. Further, a ratio between the transverse directional length of the upper surface of the keytop of the key for English letter and the vertical directional length thereof is preferably in a range from 15:14 to 15:13. Also, preferably, the size of the main body is generally the same as an A5 file size, and a ratio between an area occupied by the keys and that occupied by an armrest is in a range from 1.5:1 to 1.3:1.

According to the above structure, the vertical directional length of the keyboard can be shortened to enable the miniaturization thereof. Also, the operability of the keyboard is facilitated by prolonging the transverse directional length of the keytop, compared to the vertical directional length thereof, to enlarge the operating surface. Further, since a relatively large armrest area is obtained, a notebook type computer improved in operability results.

BRIEF DESCRIPTION OF THE DRAWINGS

These and other objects of the present invention will become apparent from the following detailed description of the preferred embodiment of the invention, taken in connection with the accompanying drawings.

In the drawings.

DESCRIPTION OF THE PREFERRED EMBODIMENTS

Figure 1:
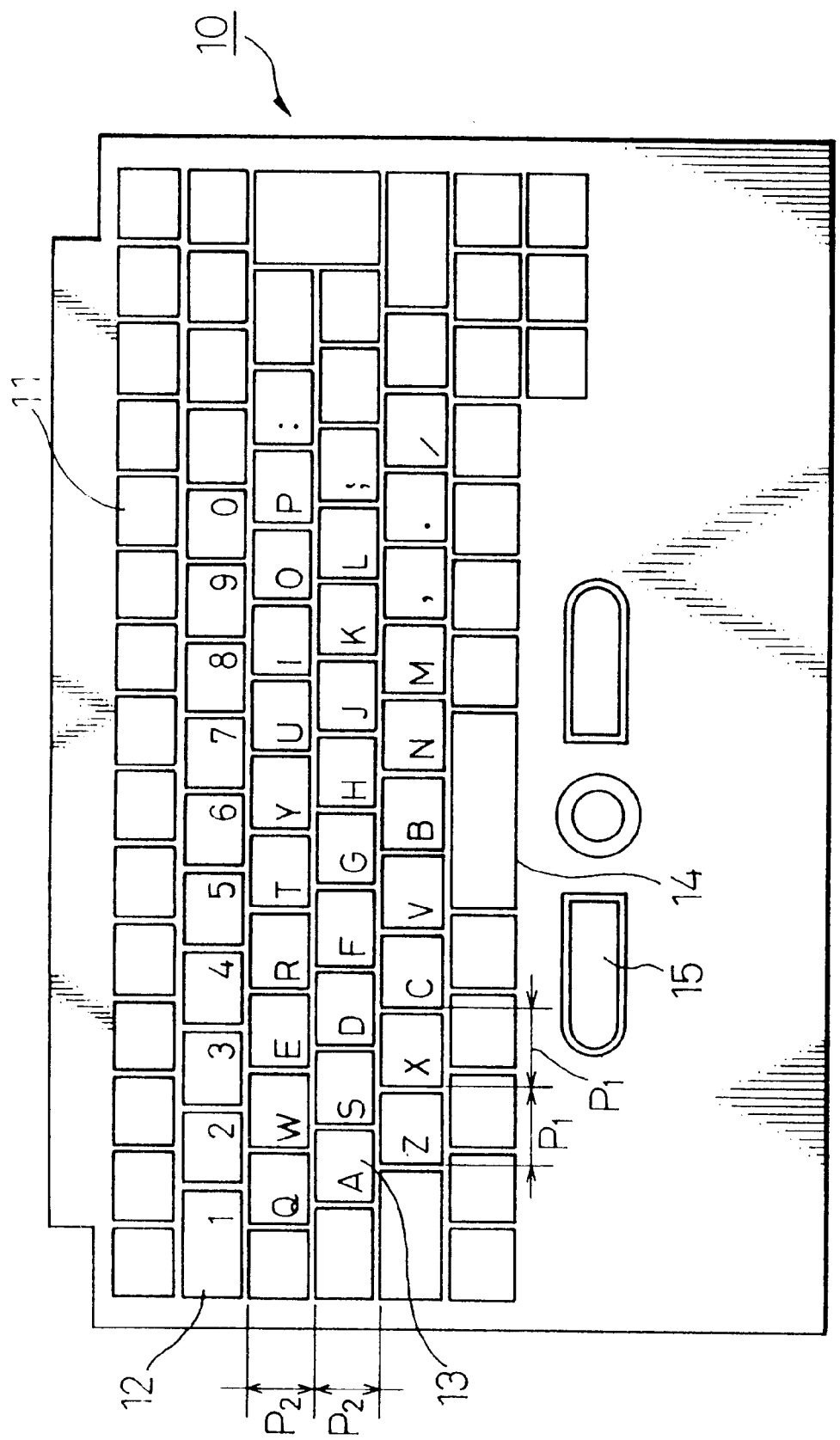
FIG. 1 is a plan view of a keyboard according to one embodiment of the invention.

FIG. 1 is a plan view of an embodiment of a keyboard according to the present invention. The keyboard 10 of this embodiment includes function keys 11, numerical keys 12, English letter keys 13, a shift key 14, conversion keys 15 or others, all of which are arranged in transverse lines and vertical rows in a matrix manner with a small gap between every two adjacent keys.

One of characteristics of this embodiment resides in that, at least in the arrangement of the English letter keys 13, the transverse directional pitch $P_1$ is larger than and not equal to the vertical directional pitch $P_2$. A ratio between $P_1$ and $P_2$ is preferably in a range between 15:14 to 15:13.

Figure 2:
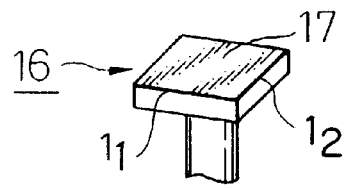
FIG. 2 is a perspective view of a keytop according to one embodiment.
Figure 3:
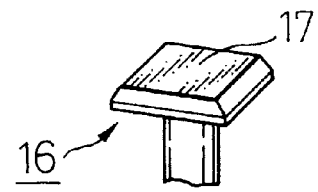
FIG. 3 is a perspective view of a keytop according to another embodiment.

As shown in FIG. 2, a transverse directional length $l_1$ of an upper surface (operating surface) 17 of a keytop 16 is not equal to a vertical directional length $l_2$. Rather, the transverse directional length $l_1$ is larger than the vertical directional length $l_2$, so that a ratio between directional lengths $l_1$ and $l_2$ is in a range between 15:14 to 15:13. In this regard, even if the outer periphery of the upper surface of the keytop is chamfered as shown in FIG. 3, the above ratio in the operating surface 17 is in the same range from 15:14 to 15:13. Since the key-in operation becomes inconvenient if the vertical directional length of the operating surface 17 is too short, the above defined ratio between the transverse direction and the vertical direction is favorable.

According to the keyboard of a preferred embodiment of the present invention, the miniaturization of the keyboard is achieved because an area occupied by the keytops is minimized, due to the smaller vertical directional pitch $P_1$ of the keytops of English letter keys 13 compared with the transverse directional pitch $P_2$ thereof. Also, since the longer transverse directional length is adopted compared with the vertical directional length of the operating surface of the keytop of the English letter keys 13, the key-in operability is guaranteed, notwithstanding the miniaturization of the keyboard.

Figure 4:
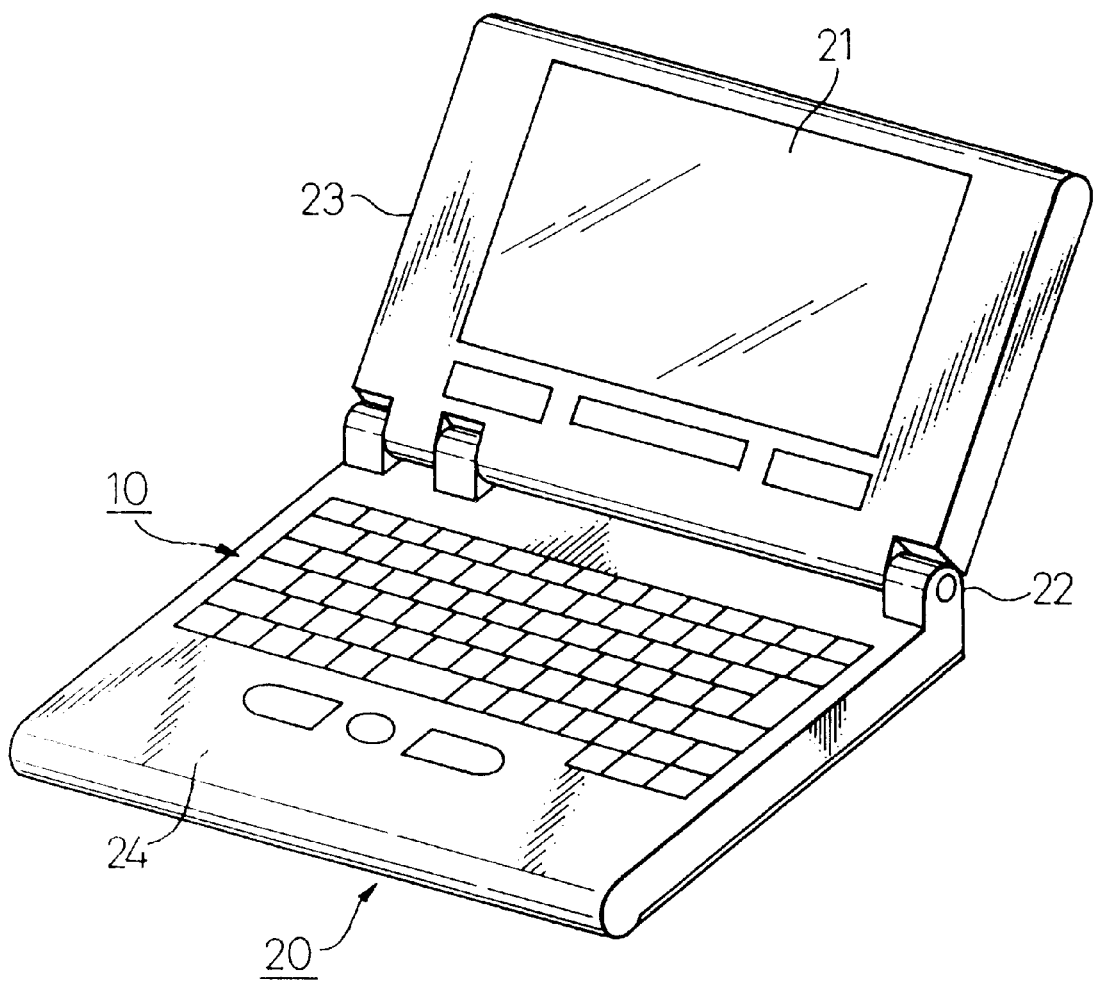
FIG. 4 is a perspective view illustrating one embodiment of a notebook type computer according to the invention.
Figure 5:
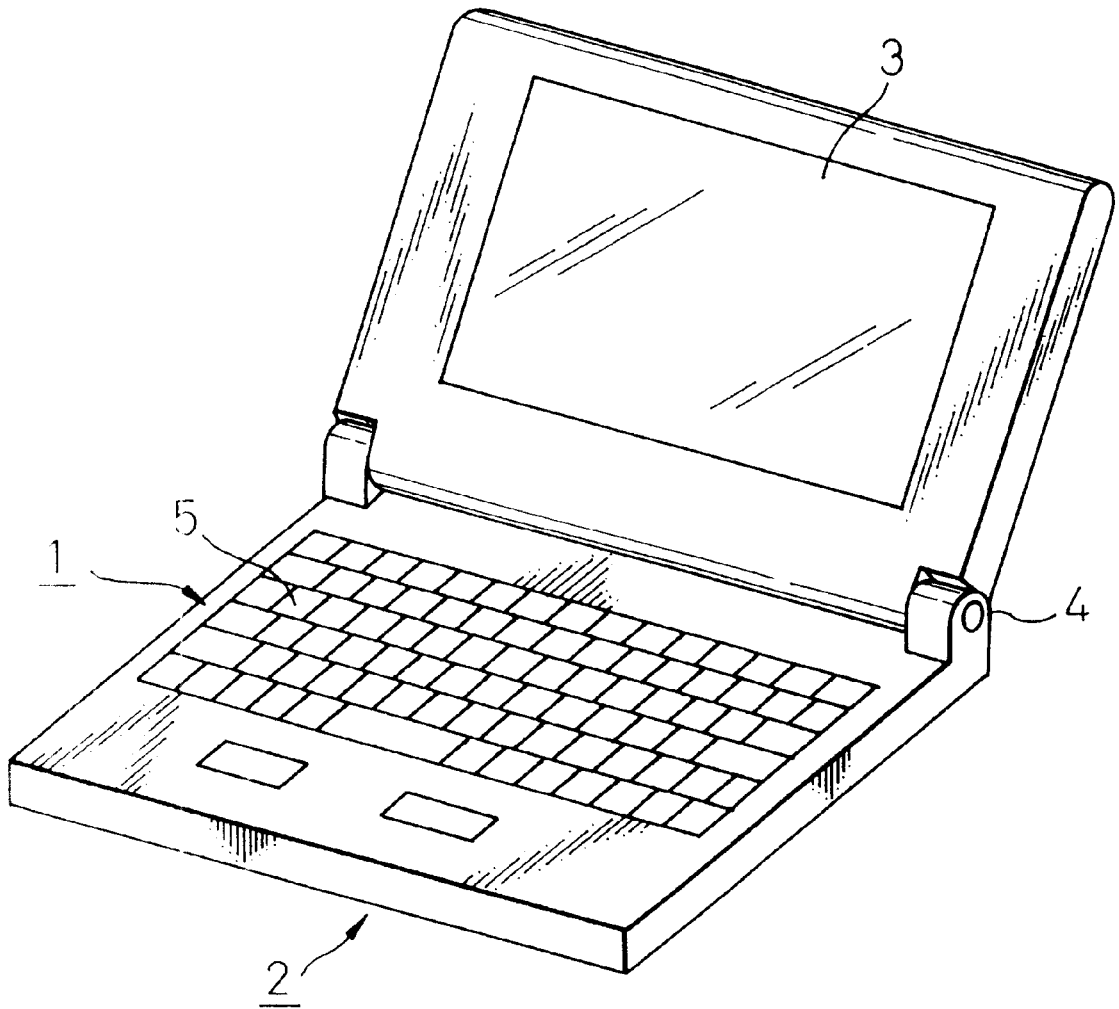
FIG. 5 is a perspective view illustrating a conventional notebook type computer.
Figure 6:
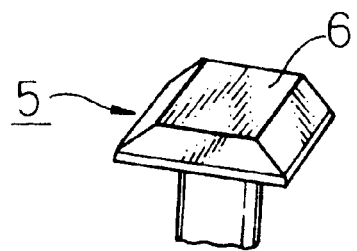
FIG. 6 is a perspective view of a conventional keytop.

FIG. 4 is a perspective view of a notebook type computer of one embodiment according to the present invention. As shown in the drawing, the computer has a main body 20 with a CPU built therein and a keyboard 10, a display 21 and a hinge section 22 for coupling the display 21 with the main body 20, wherein the display 21 constitutes an openable and closable cover 23 for the main body 20. The main body has a size that is approximately equal to the size of an A5 file. The keyboard includes a plurality of keys having keytops arranged in transverse lines and vertical rows in a matrix manner with a small gap between every two adjacent keytops.

At least the English letter keys in the keyboard 10 are arranged so that a transverse directional pitch of the keytops is larger than a vertical directional pitch thereof, and each of the keytops has an upper surface wherein the transverse directional length is longer than the vertical directional length. The ratio between the transverse directional pitch and the vertical directional pitch is in a range from 15:14 to 15:13, which is the same as the preceding embodiment. Also, a ratio between the transverse directional length and the vertical directional length of the upper surface of the English letter keytop is in a range from 15:14 to 15:13, which is the same as the preceding embodiment.

According to this embodiment, it is possible to display information which is input by a key-in operation at the keyboard 10 in the main body 20 while opening the cover 23 from the main body 20, as shown in FIG. 4. The input information is processed by a CPU in the interior of the main body. The key-in operation is facilitated because an area wherein an armrest 24 is provided is increased due to the reduction of an area occupied by the keytops, caused by the special arrangement of English letter keys wherein the vertical directional pitch is smaller than the transverse directional pitch.

In addition, since the transverse directional length is longer than the vertical directional length in the operating surface of the keytop, the key-in operability is not disturbed. In this regard, the ratio between the transverse directional length and the vertical length is preferably in a range as defined hereinbefore, because the excessively short vertical length of the keytop disturbs the key-in operation. To guarantee the necessary area for the armrest, a ratio is preferably in a range from 1.5:1 to 1.3:1 between areas to be occupied by the keys and the armrest.

According to the keyboard and the notebook type computer of the present invention, the ratio between the transverse and vertical directional pitches of the keytops and a ratio between the transverse and vertical directional lengths of the operating surface of the keytop are in a range from 15:14 to 15:13, respectively, which results in the reduction in the vertical dimension of the keyboard and thus of the computer to realize a miniaturization thereof. Since the necessary transverse directional pitch is maintained even in such circumstances, an erroneous key press can be avoided. Thus, the present invention contributes both to the maintenance of operability and the miniaturization of the keyboard and computer.

It is to be understood that the invention is by no means limited to the specific embodiments illustrated and described herein, and that various modifications thereof may be made which come within the scope of the present invention as defined in the appended claims.

We claim:

1. A notebook type computer, comprising:
   a main body;
   a keyboard, positioned on the main body, having a plurality of keys, including English letter keys, each of the plurality of keys having a keytop with an upper surface, a transverse directional pitch, and a vertical directional pitch, the plurality of keys being arranged in transverse lines and vertical rows in a matrix, with a small gap formed between adjacent keytops; and
   a cover, having a display portion, that closes from an open position to cover the main body, wherein
   the transverse directional pitch of the keytops of the English letter keys is larger than the vertical directional pitch and a ratio between the transverse directional pitch and the vertical directional pitch is in a range from 15:14 to 15:13, and wherein
   a length of the upper surface in the transverse direction is larger than in the vertical direction, and the main body has a size approximately equal to an A5 file.

2. The notebook type computer of claim 1, wherein a ratio between the length of the upper surface in the transverse direction and the vertical direction is in a range from 15:14 to 15:13.

3. The notebook type computer of claim 1, the main body further comprising an armrest, wherein a ratio between an area occupied by the plurality of keys and an area occupied by the armrest is in a range from 1.5:1 to 1.3:1.

4. A keyboard positioned on a main body of a notebook computer, comprising:
   a main body having a size approximately equal to an A5 file; and
   a plurality of keys including English letter keys, each of the plurality of keys having a keytop with an upper surface and a pitch corresponding respectively to a transverse direction and a vertical direction, wherein the pitch between English letter keys corresponding to the transverse direction is larger than the pitch corresponding to the vertical direction, and a ratio between the pitch in the transverse direction and the vertical direction is in a range from 15:14 to 15:13, and a ratio between a length of the upper surface in the transverse direction and a length in the vertical direction is in a range from 15:14 to 15:13.

* * * * *